United States Patent
Dcosta et al.

(10) Patent No.: US 11,379,909 B2
(45) Date of Patent: Jul. 5, 2022

(54) COMPUTERIZED ITEM RENTAL USING BEACONS

(71) Applicant: ORACLE INTERNATIONAL CORPORATION, Redwood Shores, CA (US)

(72) Inventors: Noel Henry Edward Dcosta, Bangalore (IN); Sushmitha Sundar, Bangalore (IN); Manish Somani, Parker, CO (US)

(73) Assignee: Oracle International Corporation, Redwood Shores, CA (US)

(*) Notice: Subject to any disclaimer, the term of this patent is extended or adjusted under 35 U.S.C. 154(b) by 571 days.

(21) Appl. No.: 15/970,078

(22) Filed: May 3, 2018

(65) Prior Publication Data
US 2019/0340680 A1 Nov. 7, 2019

(51) Int. Cl.
*G06Q 30/06* (2012.01)
*H04W 4/021* (2018.01)
*H04W 4/80* (2018.01)
*G06Q 20/20* (2012.01)

(52) U.S. Cl.
CPC ....... *G06Q 30/0645* (2013.01); *G06Q 20/208* (2013.01); *H04W 4/021* (2013.01); *H04W 4/80* (2018.02)

(58) Field of Classification Search
CPC ............ G06Q 30/0645; G06Q 20/208; G06Q 20/3224; H04W 4/021; H04W 4/80
See application file for complete search history.

(56) References Cited

U.S. PATENT DOCUMENTS

| | | | |
|---|---|---|---|
| 5,917,407 A | 6/1999 | Squire et al. | |
| 6,708,879 B2 | 3/2004 | Hunt | |
| 8,526,884 B1 * | 9/2013 | Price | H04W 4/21 455/41.2 |
| 9,432,808 B1 * | 8/2016 | Reyes | H04W 4/021 |
| 9,633,493 B2 | 4/2017 | Raina et al. | |

(Continued)

FOREIGN PATENT DOCUMENTS

CN 104361428 2/2015

OTHER PUBLICATIONS

Pavel Kriz, Filip Maly, Tomas Kozel, "Improving Indoor Localization Using Bluetooth Low Energy Beacons", Mobile Information Systems, vol. 2016, Article ID 2083094, 11 pages, 2016. https://doi.org/10.1155/2016/2083094 (Year: 2016).*

(Continued)

*Primary Examiner* — Carrie S Gilkey
(74) *Attorney, Agent, or Firm* — Kraguljac Law Group, LLC

(57) ABSTRACT

Systems, methods, and other embodiments associated with computerized item rental using beacons are described. In one embodiment, a method includes maintaining a data structure mapping user identifiers to beacon identifiers associated with rental items being rented by corresponding users. The example method may also receiving a beacon signal from a beacon device associated with a rental time. The example method may also include querying the data structure using a beacon identifier extracted from the beacon signal to determine if the rental item is rented or available for rent. The example method may also include creating an entry within the data structure to indicate that the rental item is now being rented.

19 Claims, 10 Drawing Sheets

(56) References Cited

U.S. PATENT DOCUMENTS

| | | | | |
|---|---|---|---|---|
| 9,674,684 | B1 | 6/2017 | Meldelson | |
| 2001/0037298 | A1* | 11/2001 | Ehrman | G06Q 10/02 |
| | | | | 705/40 |
| 2003/0125961 | A1* | 7/2003 | Janda | G06Q 10/087 |
| | | | | 705/307 |
| 2004/0122688 | A1 | 6/2004 | Janda | |
| 2004/0176969 | A1* | 9/2004 | Fujinuma | G06Q 10/02 |
| | | | | 705/5 |
| 2007/0200664 | A1 | 8/2007 | Proska et al. | |
| 2010/0145865 | A1* | 6/2010 | Berger | G07B 15/00 |
| | | | | 705/307 |
| 2014/0278608 | A1* | 9/2014 | Johnson | G06Q 50/30 |
| | | | | 705/5 |
| 2015/0382150 | A1* | 12/2015 | Ansermet | A61B 5/112 |
| | | | | 455/41.1 |
| 2018/0122022 | A1* | 5/2018 | Kelly | G06Q 50/12 |

OTHER PUBLICATIONS

Catapult, Inc. (1999). Step By Step Microsoft Access 2000, pp. 8, 32, and 33. Redmond, WA: Microsoft Press. (Year: 1999).*
SmartX, Bluetooth-Based Asset Tracking Solutions, pp. 1-10, downloaded Nov. 23, 2017 from: https://smartxtechnology.com/solutions-2/bluetooth-beacons-for-asset-inventory-monitoring1/ (Year: 2017).*
SmartX, Bluetooth-Based Asset Tracking Solutions, pp. 1-10, downloaded Nov. 23, 2017 from: https://smartxtechnology.com/solutions-2/bluetooth-beacons-for-asset-inventory-monitoring1/.
Beaconstac, Beacons in the Enterprise: 7 Ways to Make the Most of it, pp. 1-5, downloaded Mar. 9, 2018 from: https://blog.beaconstac.com/2015/02/beacons-in-the-enterprise-7-ways-to-make-the-most-of-it/.

* cited by examiner

COMPUTERIZED ITEM RENTAL USING BEACONS

BACKGROUND

Many businesses provide rental services where users can rent items. In one example, a hardware store allows users to rent power washers, chainsaws, and a variety of other equipment. Unfortunately, there is a significant amount of manual input required by current technical processes for tracking the rental of items through computer implemented processes and applications. A customer usually enters a store and approaches a rental department to speak with an employee about renting an item. The employee must manually create an entry, such as within an electronic ledger or through a rental tracking application of a computer, to indicate that the customer is renting the particular item. The employee must manually input through the computer information about the customer and the item to be rented. In this way, rental information is created through user input with the computer for tracking the rental of the item.

When the customer returns the item to end the rental, the customer brings the item back to the rental department and speaks with the employee about returning the item to end the rental. The employee must input information about the user and the item in order to locate the rental information through the computer. The employee uses the rental information to calculate an amount owed by the customer for the rental, and accordingly bills the customer the calculated amount. Such computer implemented technical processes for tracking rentals rely substantially on manual user input, which can be error prone and inefficient.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
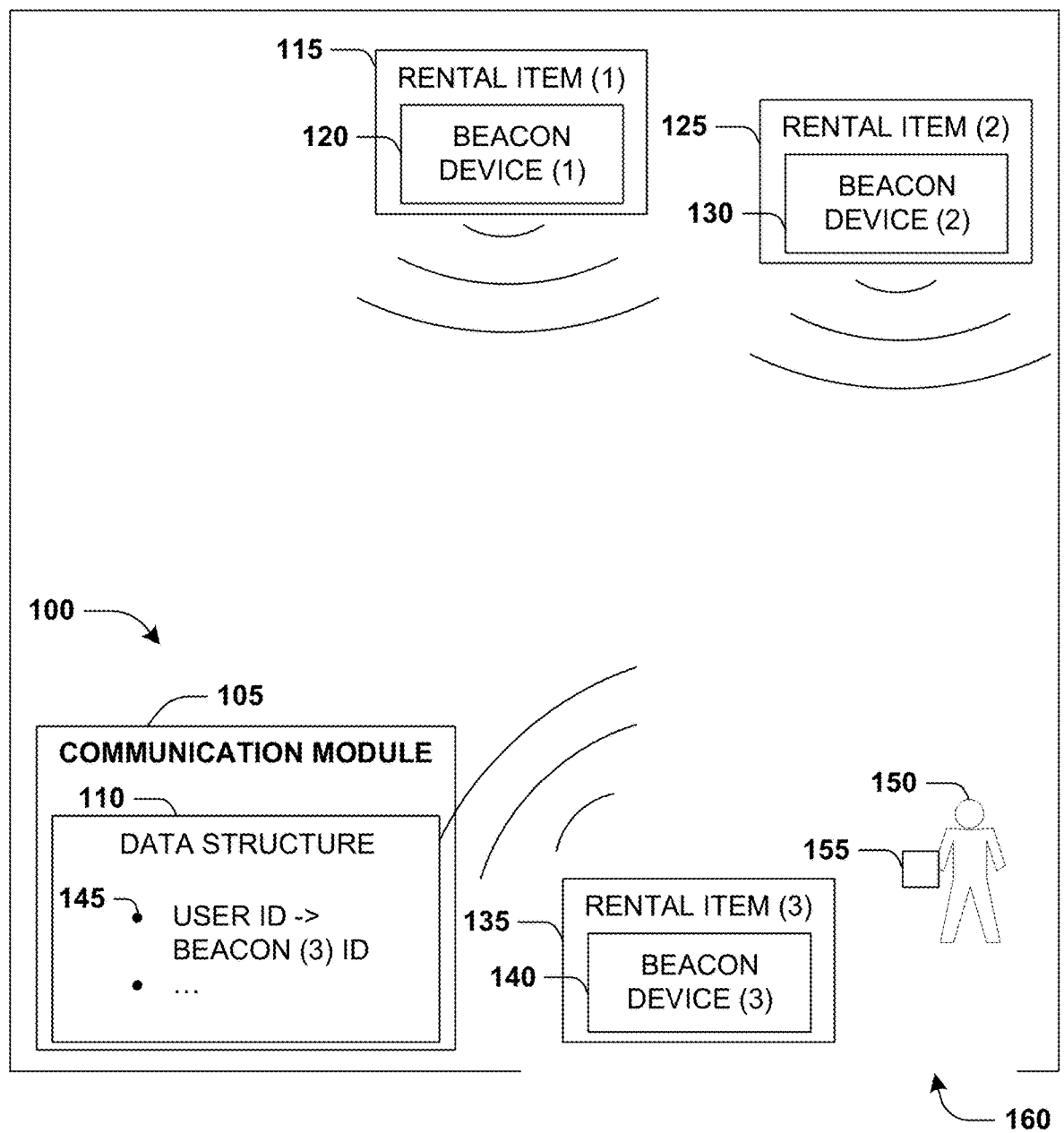
FIG. 1 illustrates an embodiment of a system associated with computerized item rental using beacons.

Computerized systems and methods are described herein that provide for computerized detection and tracking of items using beacons. In one embodiment, the present system determines rental states of items and controls a rental process for the items based on, at least in part, beacon signals as described herein. The present computer implemented technical process improves upon existing technical processes for tracking rental of items by using beacon signals to detect a physical presence of an item and to track the start and end of the item being rented. Instead of relying upon manual user input of rental information to track item rentals, which is inefficient and error prone, this computer implemented technical process provides a control system for automatically detecting and tracking that an item is being rented or returned based upon beacon signals received from beacon devices attached to such items.

In particular, beacon devices are attached to rental items available to rent, such as by a business that rents such rental items. For example, one beacon device is attached to each rental item in a one-to-one relationship. A beacon device, such as a Bluetooth transmitter, is configured to periodically or continuously emit beacon signals. The beacon signals include a beacon identifier of the beacon device. The beacon identifier is a unique identifier that can be used to identify the particular beacon device. Thus, for each beacon device attached to a rental item, the beacon identifier of the beacon device is assigned to the rental item that the beacon device is attached to. The beacon assignments are stored in a database as will be described below. Accordingly, the present system can detect and identify a rental item by detecting the beacon signals from the assigned beacon device.

In one embodiment, the present system includes a communication module implemented by a computer to control a wireless receiver to listen for beacon signals transmitted by beacon devices attached to rental items. The computer may comprise a tablet, a smart phone, a desktop, or any other computing device having communication functionality, such as a Bluetooth enabled device, to listen for beacon signals.

The communication module can be used by the business to determine when rental items come within communication range of the computer. For example, a rental item may be moved from a stock room (out of range) to a front room by the computer (within range) to start a rental process, or the rental item by carried into the front room (within range) from outside the premises (out of range) when being returned. When a rental item is within range, beacon signals from the rental item are detected, which indicates the physical presence of the rental item. The communication module uses the detection of the beacon signals and physical presence to determine and control a rental status/state of the rental item. For example, the rental item is either leaving the business to start a rental of the rental item or is being returned to the business to end the rental of the rental item.

Figure 2:
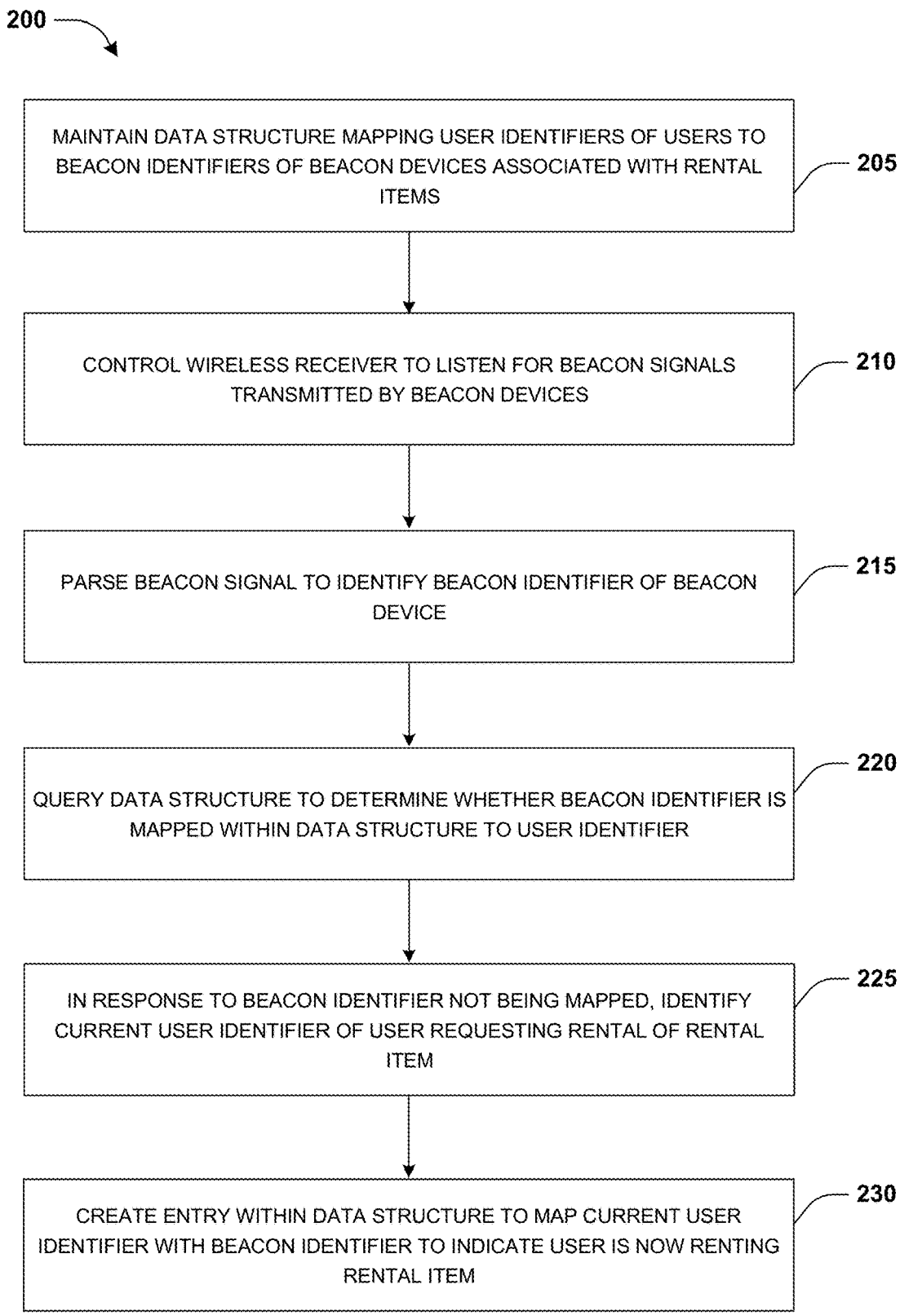
FIG. 2 illustrates an embodiment of a method associated with computerized item rental using beacons.

With reference to FIG. 1, one embodiment of a system 100 associated with computerized item rental using beacons is illustrated and summarized, and a more detailed description is provided with reference to FIG. 2. The system 100 is implemented as a communication module 105 hosted on a computing device, such as the computer 515 of FIG. 5. The computing device comprises a wireless receiver, such as a Bluetooth receiver, that can be controlled by the communication module 105 to listen for beacon signals from beacon devices. The communication module 105 is used, in one embodiment, by a business to detect, track, and control a rental process of rental items. For simplicity, FIG. 1 shows example rental items as a first rental item 115, a second rental item 125, and a third rental item 135, but the system 100 may operate with any number of rental items. The communication module 105 tracks rental status and information for each item, such as what rental items are currently rented and by whom, within a data structure 110.

In one embodiment, the data structure 110 comprises a table with rows. Each row may correspond to a rental item. A row for a rental item may be populated with an identifier of the rental item, an identifier of a beacon device attached to the rental item, a booking identifier indicating that a user is renting the rental item, a user identifier of a user renting the rental item, and/or other information. The row may be populated with a field that can be set to indicate whether the rental item is currently being rented or there is no field and merely the existence of the row indicates that the rental item is being rented because rows are deleted when a rental item is returned to end a rental. The row may be created in the data structure 110 when a rental of the rental item begins, and is removed from the data structure 110 when the rental ends. It may be appreciated that other types and structures of data structures may be used as the data structure 110.

As previously stated, each item includes a beacon device attached to the item and the corresponding beacon identifier is assigned to the item. The communication module 105 determines how to track the rental information based upon beacon signals received from beacon devices associated with the rental items. A first beacon device 120 is attached to the first rental item 115, a second beacon device 130 is attached to the second rental item 125, a third beacon device 140 is attached to the third rental item 135, etc. Each beacon device is configured to transmit unique identifiers that can be used by the communication module 105 to distinguish between beacon devices and their associated rental items.

For example, the third beacon device 140 is configured to periodically or continuously transmit beacon signals encoded with a third beacon identifier. The third beacon identifier can be set to a particular value that functions as an identifier of the third rental item 135. The assignments of beacon identifiers-to-rental items may be stored in the data structure 110. A user 150 may carry the third rental item 135 from a rental pickup location towards an exit 160 of the business where the communication module 105 is located. When the third beacon device 140 comes within communication range of the wireless receiver, the wireless receiver will receive beacon signals emitted by the third beacon device 140. The wireless receiver is configured to provide the beacon signals to the communication module 105 for processing. Receiving beacon signals indicates to the communication module 105 that the physical presence of a rental item is detected.

In one embodiment of processing the beacon signals detected from the third beacon device 140, the communication module 105 parses the beacon signals to extract the third beacon identifier of the third beacon device 140. The communication module 105 queries the data structure 110 using the third beacon identifier to determine whether the third beacon identifier is mapped to any user identifiers within the data structure 110. In response to the third beacon identifier not being mapped to any user identifiers, the communication module 105 determines that the third rental item 135 is not rented and available for rent. Therefore, the communication module 105 determines the conditions (1) that the physical presence of third rental item 135 was detected and (2) that the rental status for the rental item is "not rented." These conditions indicate that the third rental item 135 was brought to "start" a rental process rather than being returned to "end" a rental process. The communication module 105 is configured to initiate and control a start rental process or an end rental process according to this determination. In the present example, a start rental process is initiated.

Since the start rental process is initiated, a user identifier is requested since a user is requesting rental of the third rental item. Thus, the communication module 105 identifies a current user identifier of a user requesting rental of the rental item. For example, the user 150 may utilize a computing device 155 to submit a request to rent the third rental item 135. The request may comprise the user identifier or may be used to construct the user identifier for the user 150. In this way, the communication module 105 can create a mapping 145 within the data structure 110 to map the third beacon identifier (which is assigned to the third rental item) to the user identifier to indicate that the third rental item 135 is assigned to the user identifier.

Once created and stored in the data structure 110, the existence of the mapping between the rental item and the user may be used to indicate the rental status of the third rental item 135. For example, if a rental item is mapped to a user identifier, then the rental item is rented. If the rental item is not mapped to an identifier or if no entry exits for the rental item, then the rental item is not rented. In another embodiment, a separate rental status field (in addition to the mapping) may be included to indicate the rental status/state of a rental item. For example, the status field for each rental item may be assigned values such as by setting a "1" or "0" value, a "yes/no" value, or using a term like "rented" or "available", or other desired value. After the mapping is created, the communication module 105 considers that the user 150 is now renting the third rental item 135 and the third rental item 135 cannot be assigned to another user.

When the user 150 returns the third rental item 135 to the business and comes within range of the communication module 105, the wireless receiver of the computer will detect the beacon signals emitted by the third beacon device 140, and will provide the beacon signals to the communication module 105. The communication module 105 parses the beacon signals to extract the beacon identifier. The beacon identifier is then used to identify the beacon device, which in this case is the third beacon device 140.

The communication device 105 then determines the rental status of the item associated with the third beacon device 140 to determine whether the item is being rented or being returned. As explained previously, the communication module 105 queries the data structure 110 using the beacon identifier to determine whether the beacon identifier is mapped to any user identifiers within the data structure 110. Since the third rental item was rented as explained above, the beacon identifier is found in the data structure 110 and includes a mapping to a user (e.g., mapping 145).

In response to the beacon identifier being mapped to the user identifier of the user 150, the communication module 105 determines that the user 150 is returning the third rental item 135 to end the rental. The "end" rental process is initiated. Accordingly, the communication module 105 calculates a charge amount for the rental of the third rental item 135, and executes a charge command to charge the charge amount to an account of the user 150. The communication module 105 removes the mapping 145 from the data structure 110 to change the rental status and indicate that the third rental item 135 is available to rent.

With reference to FIG. 2, one embodiment of a computer implemented method 200 associated with computerized item rental using beacons is illustrated. In one embodiment, the method 200 is performed by the communication module 105 and system 100 of FIG. 1 utilizing various computing resources of the computer 515 or other computers. The computing resources, such as the processor 520, are used for executing instructions associated with controlling a wireless receiver, parsing a beacon signal, querying a data structure, and creating entries within the data structure. Memory 535 and/or disks 555 are used for storing the data structure to track rental of rental items. Network hardware is used for communication of rental information and charge commands between the computer 515 and remote computers over a network. The method 200 is triggered upon execution of an application on a computing device implementing the communication module 105 to track rental of rental items.

Figure 3A:
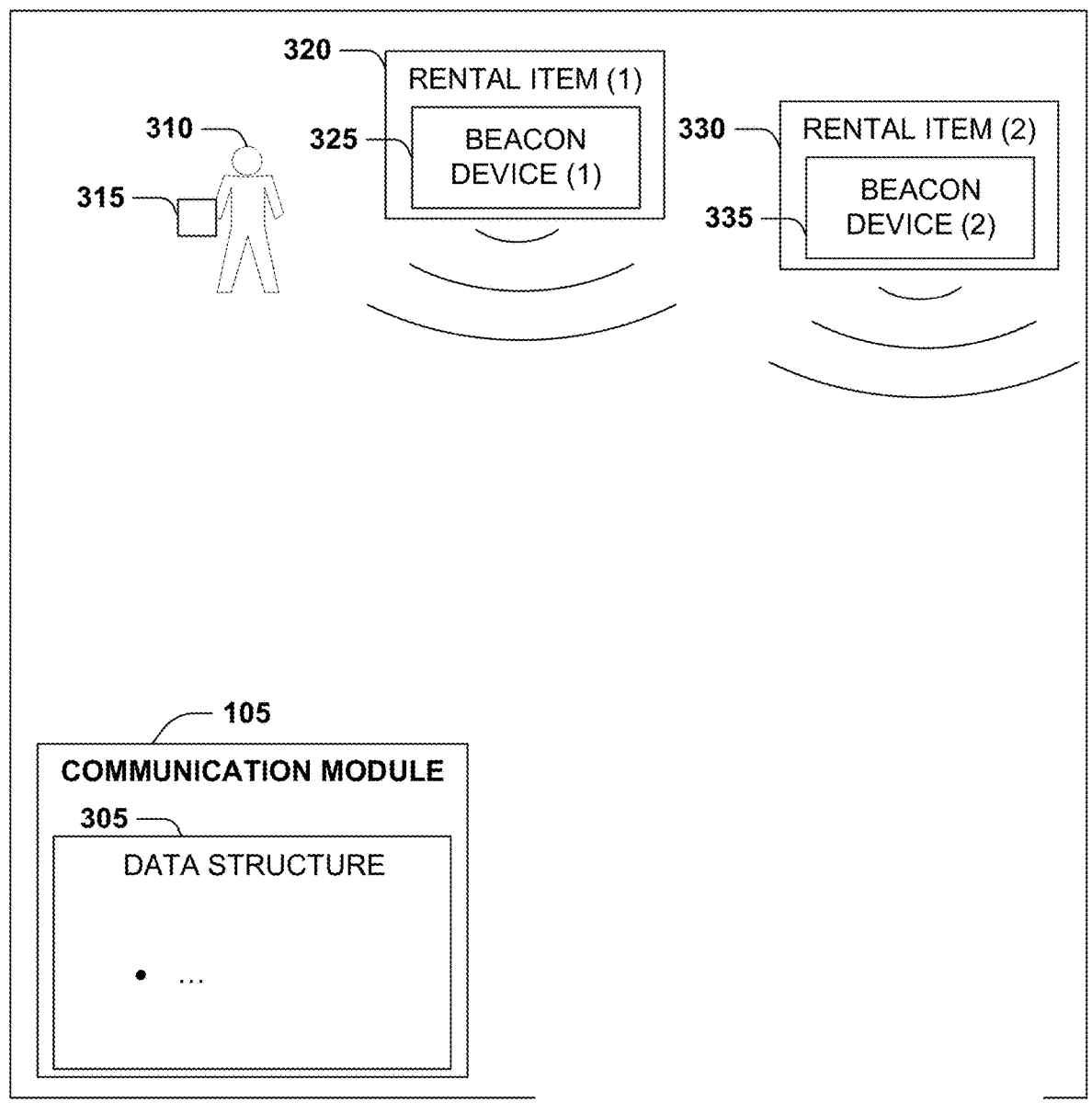
FIG. 3A illustrates an embodiment of a system associated with computerized item rental using beacons.

The communication module 105 is configured to track rental of the rental items based upon beacon signals received from beacon devices. In one embodiment, a first beacon device 325 is attached to a first rental item 320 and a second beacon device 335 is attached to a second rental item 330, as illustrated by example system 300 of FIG. 3A. A beacon device comprises a transceiver configured to emit wireless signals periodically or continuously. In one embodiment, the beacon device comprises a Bluetooth beacon sticker configured to emit Bluetooth radio signals that a Bluetooth enabled device can receive and intercept, such as by a computer hosting the communication module 105.

A beacon signal emitted by a beacon device can be encoded with information, such as a beacon identifier. The value of the beacon identifier can be dynamically set to correspond to an identifier of the beacon device, an identifier of the rental item to which the beacon device is attached, a user identifier of a user currently renting the rental item, or a booking identifier to indicate that a user is currently renting the rental item. In one embodiment, the first beacon device 325 is configured to emit a first beacon signal encoded with a first beacon identifier having a value corresponding to an identifier of the first rental item 320. The second beacon device 335 is configured to emit a second beacon signal encoded with a second beacon identifier having a value corresponding to an identifier of the second rental item 330.

At 205, the communication module 105 maintains a data structure 305, such as an electronic ledger, a table, a database, or a file, for tracking rental item information. The communication module 105 populates the data structure 305 with entries used to indicate that particular rental items are currently being rented by particular users. An entry is populated with a user identifier of a user renting a rental item. The entry maps the user identifier to a beacon identifier of a beacon device attached to the rental item being rented by that user. Thus, if the data structure 305 comprises an entry mapping a beacon identifier to a user identifier, then the communication module 105 can determine that the corresponding rental item is currently being rented. If there is no entry mapping the beacon identifier to any user identifiers, then the communication module 105 can determine that the corresponding rental item is available for rent.

At 210, the communication module 105 controls a wireless receiver of the computing device hosting the communication module 105 to listen for beacon signals transmitted by beacon devices attached to rental items of the business. In one embodiment, the communication module 105, such as the application executing on the computer, accesses and controls a Bluetooth receiver of the computer using a Bluetooth driver installed within an operating system of the computer. Commands and functions of the Bluetooth driver can be used by the communication module 105 to obtain beacon signals received by the Bluetooth receiver. In this way, the communication module 105 controls the wireless receiver to receive beacon signals and provide the communication module 105 with access to the received beacon signals.

Figure 3B:
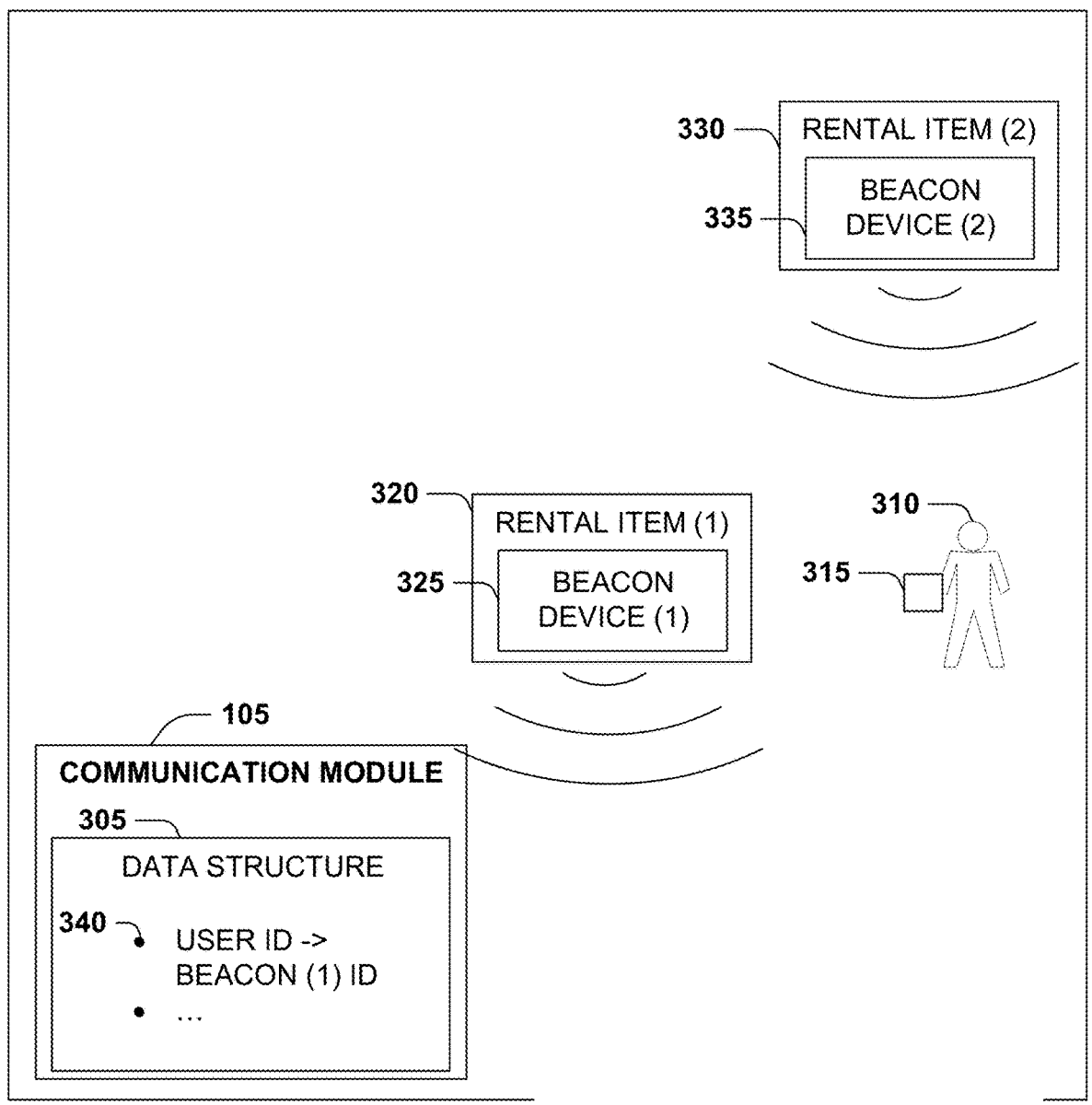
FIG. 3B illustrates an embodiment of a system associated with computerized item rental using beacons, where a rental of an item starts.

In one embodiment of receiving and processing beacon signals, a user 310 moves the first rental item 320 within communication range of the wireless receiver, as illustrated by FIG. 3B. The communication module 105 receives, by the wireless receiver, a beacon signal emitted by the first beacon device 325 attached to the first rental item 320. In one embodiment, the Bluetooth receiver of the computer receives the Bluetooth radio signals emitted by the Bluetooth transmitter of the first beacon device 325. The communication module 105 receives the beacon signal from the Bluetooth receiver through the Bluetooth driver.

At 215, the communication module 105 parses the beacon signal to extract a beacon identifier of the first beacon device 325. In one embodiment, the beacon signal was received as a sequence of characters or other data that can be parsed using parsing functionality, such as character/text parsing functionality. The communication module 105 may determine that the sequence of characters corresponds to an identifier of the first beacon device 325, an identifier of the first rental item 320, or a booking identifier indicating that the first rental item 320 is already being rented. The communication module 105 can make this determination by looking up the sequence of characters within a lookup table of identifiers. In this example, the communication module 105 determines that the extracted beacon identifier is a unique identifier of the first rental item 320.

In one embodiment of receiving and parsing beacon signals, the communication module 105 can control the wireless receiver to listen for beacon signals according to different modes. Initially, the communication module 105 controls the wireless receiver to listen for beacon signals according to a monitoring mode. While in the monitoring mode, the beacon signals are received and parsed to identify beacon device types, but not beacon identifiers, of beacon devices. That is, a beacon device can be configured to encode the beacon signals with various identifiers, such as where a first portion of the sequence of characters corresponds to a beacon device type and a second portion of the sequence of characters corresponds to the beacon identifier. The beacon device type may specify what type/category of rental item is associated with the beacon device, such as a chainsaw type, a power washer type, a carpet cleaner type, etc. Thus, the beacon device type does not specify the exact chainsaw, but merely indicates that the rental item is some type of chainsaw. In response to receiving the beacon signal while in the monitoring mode, the communication module 105 transitions to a ranging mode. While in the ranging mode, beacon signals are parsed to identify beacon identifiers of beacon devices. In one embodiment, operation of the computer is improved by reducing resource usage and power consumption because the monitoring mode may be a lower power mode than the ranging mode, and thus ranging mode is only transitioned to when a beacon device is initially detected.

At 220, the communication module 105 queries the data structure 305 using the beacon identifier corresponding to the unique identifier of the first rental item 320 to determine whether there are any entries mapping the beacon identifier to user identifiers. If there is an existing entry mapping the beacon identifier to a user identifier, then the communication module 105 can determine that the rental item is currently being rented by a corresponding user and thus is being returned by the user to end the rental. In this example, the communication module 105 determines that there are no entries within the data structure 305 mapping the beacon identifier associated with the first rental item 320 to any user identifier based upon the query. Thus, the communication module 105 determines that the first rental item 320 is not currently being rented and is available to rent because there are no entries mapping the beacon identifier.

The communication module 105 determines that the first rental item 320 is available to rent and has moved within communication range of the wireless receiver indicative of a user attempting to rent the first rental item 320. Accordingly, the communication module 105 identifies a current user identifier of the user 310 requesting rental of the first rental item 320, at 225. The communication module 105 can identify the current user identifier in various ways. In one embodiment, the user 310 submits a rental request through a computing device 315. The rental request comprises the current user identifier, such as a name of the user 310 or any other identifying information. The computing device 315 transmits the rental information, such as the current user identifier, to the communication module 105. The rental information may comprise other information, such as payment information, a description of the first rental item 320, user information, etc.

In one embodiment, a verification of the user 310 is performed, such as through the computing device 315. The verification is performed to authenticate the user 310 as being allowed to rent the first rental item 320. The user information within the rental request, such as the user identifier, an address, payment information, a username and password, or other login credentials, can be verified as being authentic. Various types of verification can be performed through the computing device 315, such as facial recognition verification, voice recognition verification, fingerprint recognition verification, and/or biometric recognition verification to authenticate the user 310 for renting the first rental item 320.

At 230, the communication module 105 creates an entry 340 within the data structure 305 to indicate that the user 310 is now renting the first rental item 320. The communication module 105 populates the entry 340 with a mapping between the beacon identifier, having a value identifying the first rental item 320, and the user identifier of the user 310. The communication module 105 can populate the entry 340 with other information, such as a rental start time corresponding to a time at which the beacon signal was received from the first beacon device 325. In this way, rental of the first rental item 320 by the user 310 is started and tracked through the data structure 305. Thus, the receipt of the beacon signal triggers an exit event of the first rental item 320 leaving the business to start rental of the first rental item 320 by the user 310.

The rental of the first rental item 320 is also tracked by dynamically modifying the beacon identifier emitted by the first beacon device 325. For example, the beacon identifier was initially set to a value corresponding to a unique identifier of the first rental item 320. Accordingly, the communication module 105 is configured to transmit a command to the first beacon device 325 to configure the first beacon device 325 to set the beacon identifier to a value corresponding to a booking identifier to indicate that the first rental item 320 is assigned to the user 310. The booking identifier may also be used to determine the rental status of the item. Setting the booking identifier means that the user 310 is now renting the first rental item 320 and that the first rental item 320 cannot be assigned to or rented by another user.

In one embodiment, the booking identifier may be generated by the communication module 105, such as in response to the successful authentication of the user 310 for renting the first rental item 320. The booking identifier may be generated as a sequence of characters that can be encoded into beacon signals emitted by the first beacon device 325. The booking identifier may be stored by the communication module 105, such as within the data structure 305. For example, the booking identifier is stored as the first beacon identifier within the entry 340 or is stored within a separate entry.

In one embodiment, a user interface can be constructed to display information relating to the rental of the first rental item 320. For example, in response to receiving the beacon signal and identifying the beacon identifier associated with the first rental item 320, the user interface is rendered on the computer hosting the communication module 105, another computer associated with the business, the computing device 315 of the user 310, or any other computer. The user interface is populated with customer information about the user 310, such as a name, address, user account, etc. The user interface is populated with rental item information of the first rental item 320, such as a description of the first rental item 320, a serial number, etc. The user interface is populated with an indication as to whether the first rental item 320 is currently rented or is available for rent. The user interface may be displayed for an employee of the business or the user 310.

In one embodiment, the first rental item 320 is stored in a storage area within communication range of the wireless receiver. The storage area may be inaccessible to the user 310. Thus, in response to identifying the current user identifier of the user 310 requesting rental of the first rental item 320, a command is transmitted from the communication module 105 to a store controller to transport the first rental item 320 from a storage location of the storage area to a rental pickup location. In one embodiment, the command is transmitted to a store controller (e.g., a mechanical or electrical device whose operation can be controlled by commands sent by the communication module 105) capable of controlling machinery to physically transport the first rental item 320 to the rental pickup location. In another embodiment, the command is transmitted to a store controller that is an employee with an instruction for the employee to transport the first rental item 320 to the rental pickup location. For example, the command may be displayed to the employee, such as through a user interface of a computer.

Figure 3C:
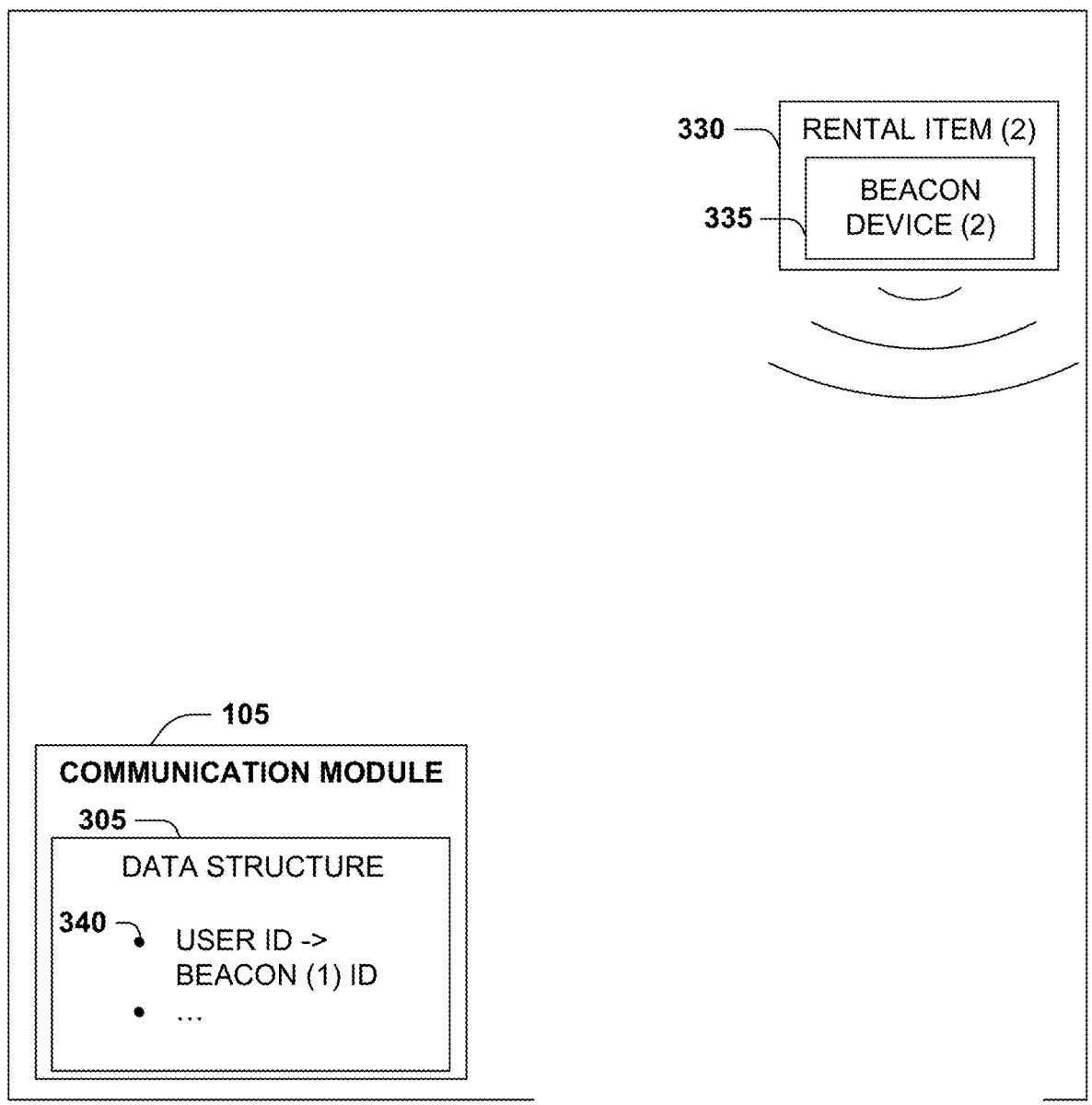
FIG. 3C illustrates an embodiment of a system associated with computerized item rental using beacons.
Figure 3D:
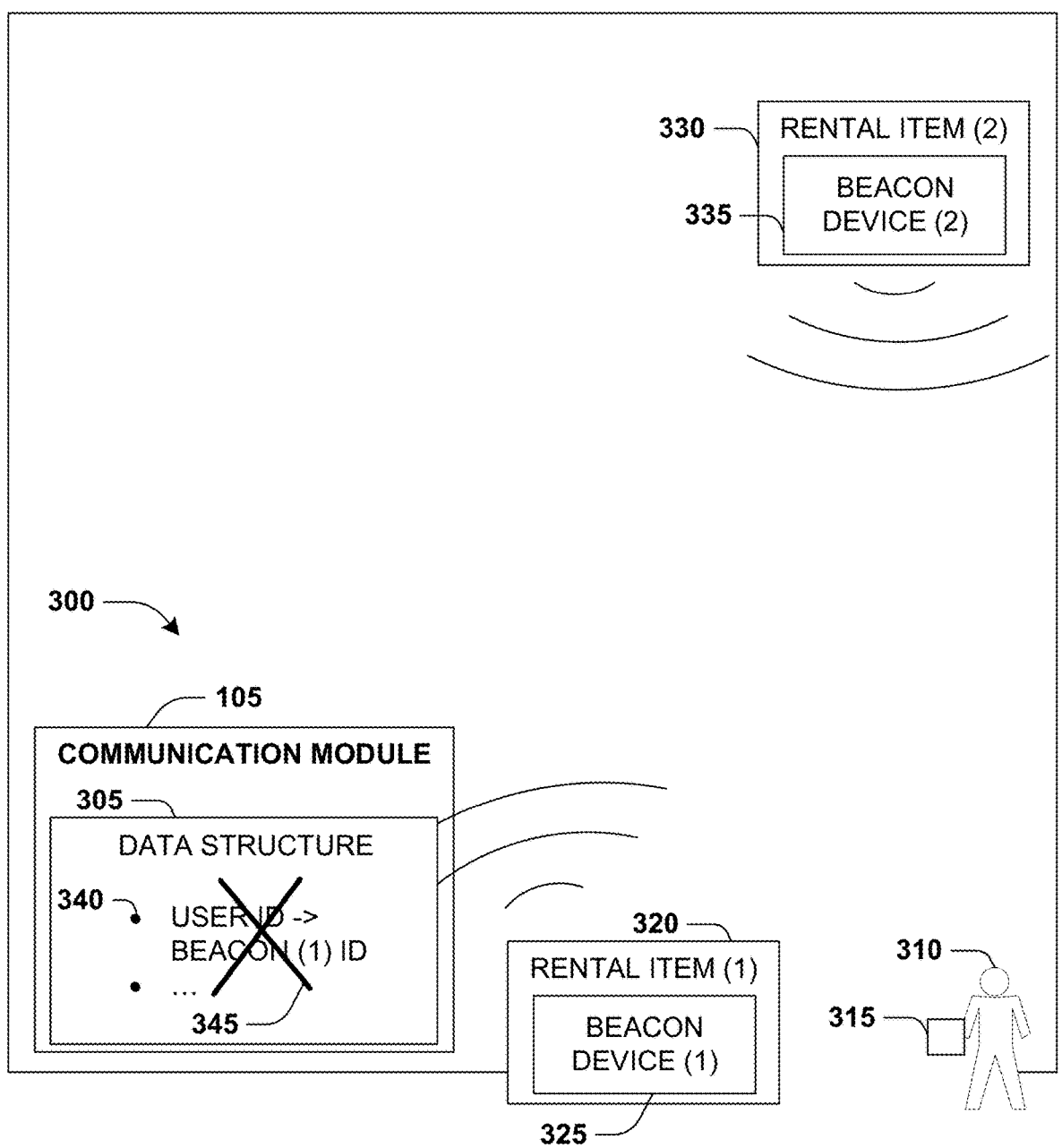
FIG. 3D illustrates an embodiment of a system associated with computerized item rental using beacons, where a rental of an item ends.

Now that the first rental item 320 has been rented by the user 310 and has left the business, the communication module 105 continues to use the wireless receiver to listen for beacon signals indicative of users renting rental items and returning rental items, as illustrated by FIG. 3C. In one embodiment, the communication module 105 receives a second beacon signal from the first beacon device 325, as illustrated by FIG. 3D. For example, the user 310 is returning the first rental item 320 to end the rental, and thus brings the first rental item 320 within communication range of the wireless receiver.

The communication module 105 parses the second beacon signal to identify the beacon identifier of the first beacon device 325. The beacon identifier may have a value set to the booking identifier that was set when the first rental item 320 was rented by the user 310. The communication module 105 queries the data structure 305 using the beacon identifier to determine that the first rental item 320 was being rented by the user 310 based upon the data structure 305 comprising the entry 340 mapping the current user identifier of the user 310 to the first beacon identifier. In this way, receipt of the second beacon signal triggers an entry event where the first rental item 320 is entering the business to be returned to end rental of the first rental item 320.

The communication module 105 calculates a charge amount for the user renting the first rental item 320. In one embodiment, the charge amount may be calculated as a fixed fee agreed upon by the user 310 for renting the first rental item 320. In another embodiment, the charge amount is based upon a duration of the rental. Accordingly, the communication module 105 determines a rental end time corresponding to a time at which the second beacon signal was received. The communication module 105 queries the data structure 305 to extract the rental start time from the entry 340. The communication module 105 calculates the charge amount based upon a rental duration derived from a difference between the rental start time and the rental end time.

In another embodiment, the communication module calculates the charge amount based upon sensor data extracted from the second beacon signal. For example, the first beacon device 325 may be associated with a sensor, such as a temperature sensor, a motion sensor, or other type of sensor, which can detect sensor data associated with the first rental item 320, such as operating temperature or motion of the first rental item 320. The first beacon device 325 can encode the sensor data into beacon signals emitted by the first beacon device 325. Thus, the communication module 105 can parse the beacon signals to extract the sensor data. In this way, the communication module 105 can evaluate the sensor data to determine an amount of time the first rental item 320 was being operated. The communication module 105 can determine that the first rental item 320 was being operated when values of the sensor data exceed a threshold indicative of operation of the first rental item 320. For example, temperature values above a certain value are indicative of a motor of the first rental item 320 being operated and thus heating up. Similarly, certain motion values can be indicative of the first rental item 320 being moved during operation. In this way, the communication module 105 can calculate the charge amount based upon the amount of time the first rental item 320 was being operated.

In response to calculating the charge amount, the communication module 105 executes a charge command to charge the amount to an account of the user 310. In one embodiment, the charge command is executed upon an account that the user 310 has with the business. In another embodiment, the charge command is transmitted over a network to a computer of a financial service, such as a bank, to charge a bank account of the user 310. Upon successful execution of the charge command, the entry 340 is removed 345 from the data structure 305 to indicate that the first rental item 320 is now available for rent. The communication module 105 may transmit a command to the first beacon device 325 to configure the first beacon device 325 to set the beacon identifier from the value of the booking identifier back to the identifier of the first rental item 320 to indicate that the first rental item 320 is now available for rent.

Figure 4:
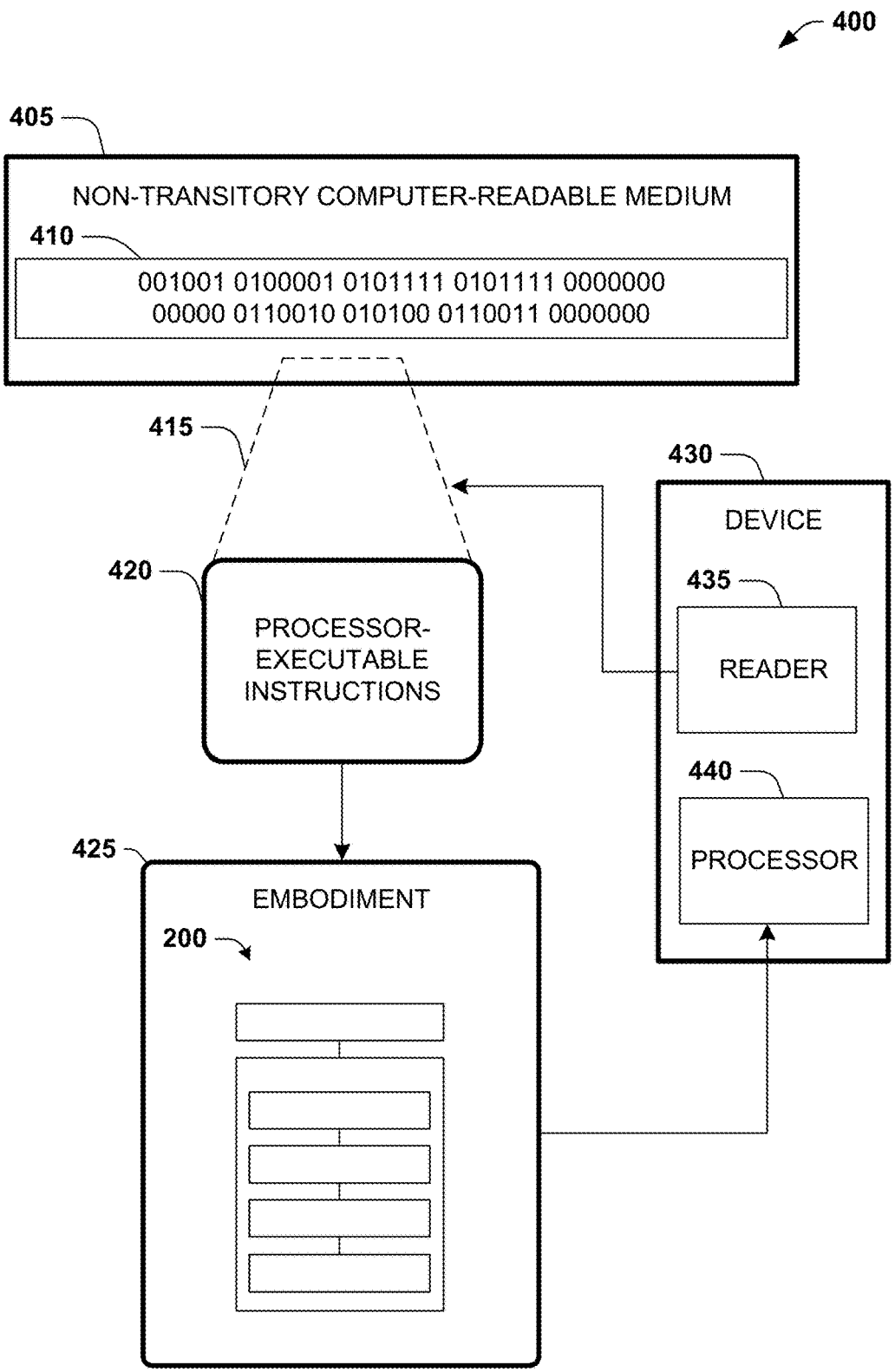
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the communication module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the communication module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
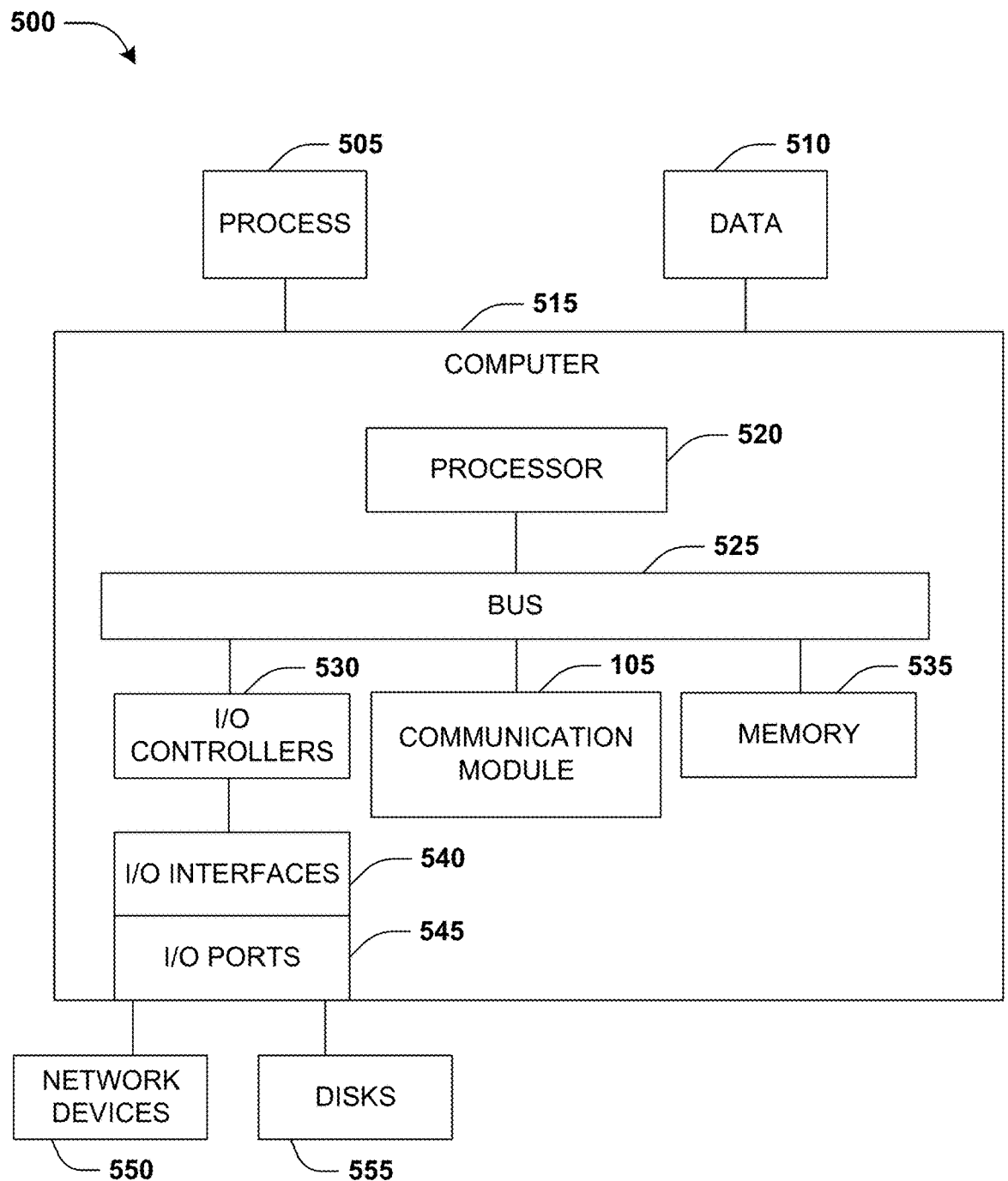
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the communication module 105 configured to facilitate the system 100 and/or the method 200 shown in FIGS. 1-2. In different embodiments, the logic of the communication module 105 may be implemented in hardware, a non-transitory computer-readable medium 505 with stored instructions, firmware, and/or combinations thereof. While the logic of the communication module 105 is illustrated as a hardware component attached to the bus 525, it is to be appreciated that in other embodiments, the logic of the communication module 105 could be implemented in the processor 520, stored in memory 535, or stored in disk 555.

In one embodiment, logic of the communication module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the communication module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
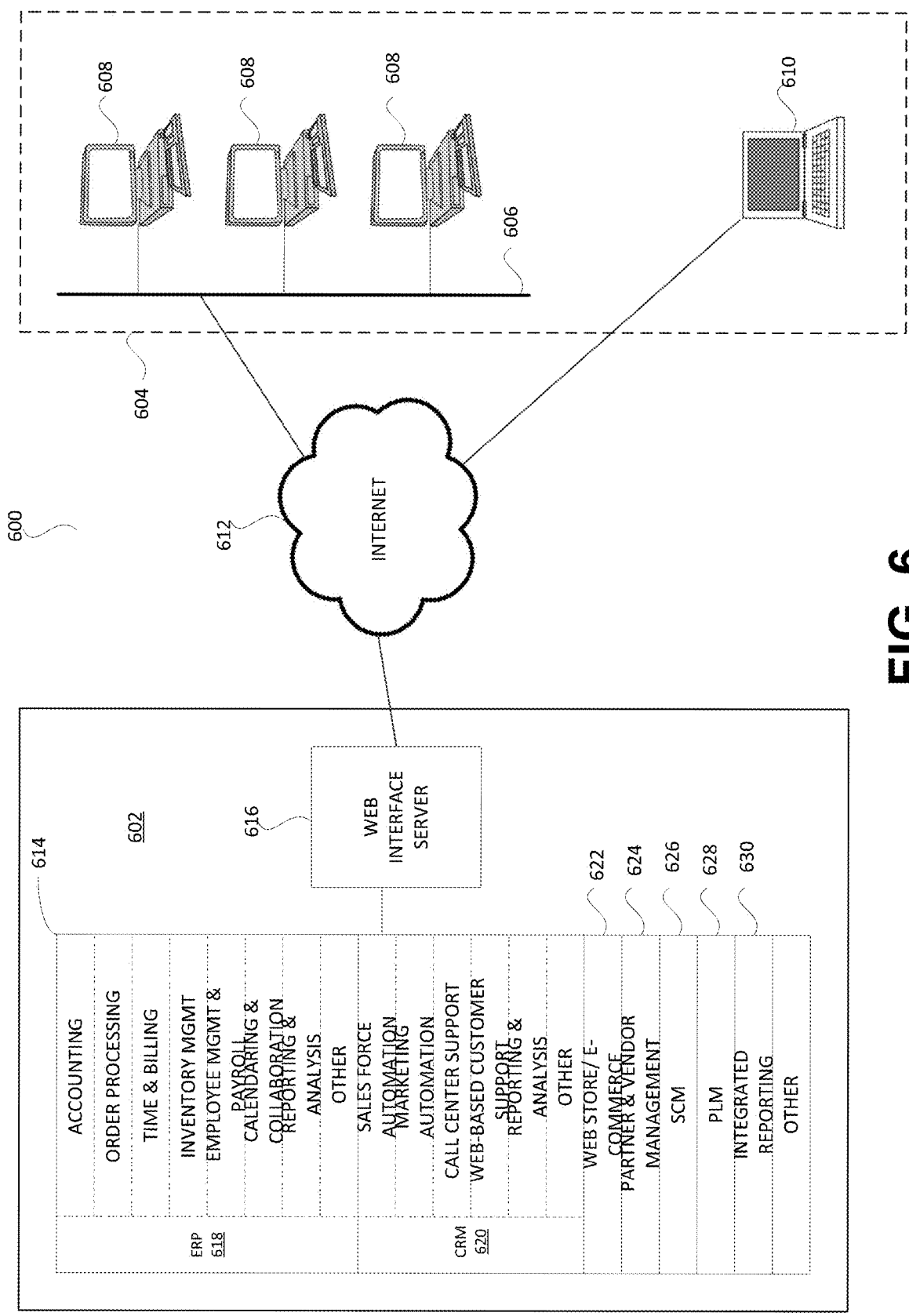
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
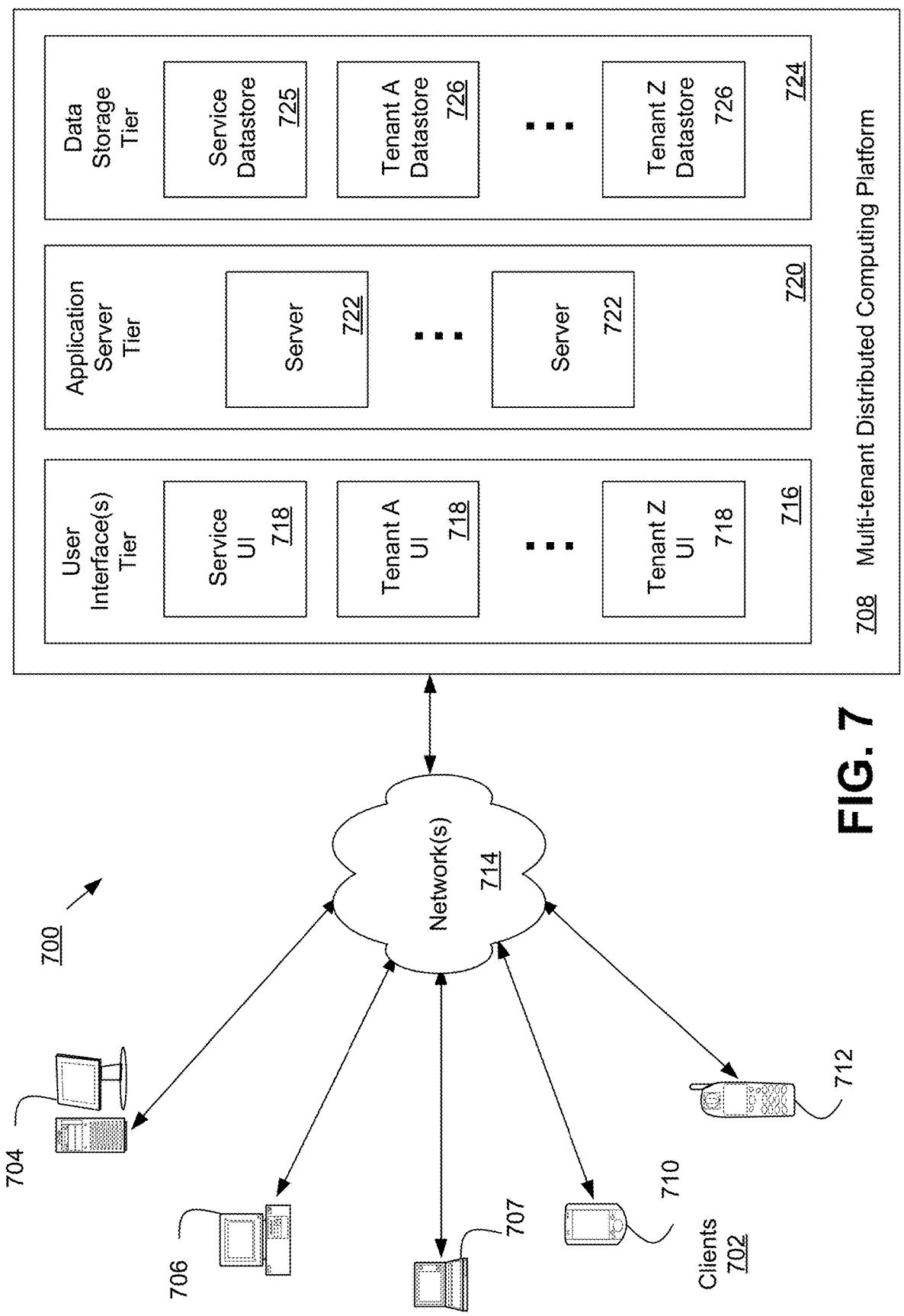
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
maintain a data structure that maps user identifiers of users to beacon identifiers of beacon devices associated with rental items being rented by corresponding users;
wherein the data structure includes a table having a plurality of rows wherein each row corresponds with a rental item that is being rented, and wherein each row includes an identifier of the rental item, a beacon identifier of a beacon device attached to the rental item, a booking identifier indicating that a first user is renting the rental item, and a user identifier of the first user renting the rental item;
wherein a row is created in the data structure when a rental of the rental item begins and the row is removed from the data structure when the rental ends;
control a wireless receiver of the computing device to listen for beacon signals transmitted by the beacon devices associated with the rental items;
wherein the wireless receiver listens for the beacon signals according to a monitoring mode;
while in the monitoring mode, in response to receiving, by the wireless receiver, a first beacon signal from a first beacon device associated with a first rental item:
  parse the first beacon signal to identify a beacon device type as a type of rental item associated with the first beacon device, but not a first beacon identifier of the first beacon device;
  transition to listening for the beacon signals according to a ranging mode;
  while in the ranging mode, parse the first beacon signal to identify the first beacon identifier of the first beacon device associated with the first rental item;
  query, using the first beacon identifier of the first beacon device, the data structure to determine whether the first beacon identifier of the first beacon device is mapped within the data structure to the user identifier of the first user; and
  in response to the first beacon identifier of the first beacon device not being mapped within the data structure, which indicates that the first rental item is not currently being rented:
    identify a user identifier of a second user requesting rental of the first rental item associated with the first beacon identifier of the first beacon device and verify the user identifier of the second user;
    create a new row within the data structure to map the user identifier of the second user to the first beacon identifier of the first beacon device to indicate that the first rental item is assigned to and rented by the second user; and
    configure the first beacon device associated with the first rental item to set the first beacon identifier of the first beacon device to the booking identifier to indicate that the second user is now renting the first rental item.

2. The non-transitory computer-readable medium of claim 1, wherein the instructions comprise instructions to:
  receive, by the wireless receiver, a second beacon signal from the first beacon device;
  parse the second beacon signal to identify the first beacon identifier of the first beacon device;
  query, using the first beacon identifier of the first beacon device, the data structure to determine that the first rental item was being rented by the second user based upon the data structure comprising the new row mapping of the user identifier of the second user to the first beacon identifier of the first beacon device;
  determine that the first rental item is being returned to end the rental of the first rental item;
  calculate a charge amount for the second user renting the first rental item;
  execute a charge command to charge the charge amount to an account of the second user;
  remove the new row from the data structure to indicate that the first rental item is not currently being rented; and
  configure the first beacon device to set the first beacon identifier of the first beacon device to the identifier of the rental item to indicate that the first rental item is available for rent.

3. The non-transitory computer-readable medium of claim 2, wherein the instructions to create the new row comprise instructions to:
  populate the data structure with a rental start time corresponding to a time at which the first beacon signal was received.

4. The non-transitory computer-readable medium of claim 3, wherein the data structure is populated with a rental start time corresponding to a time at which the first beacon signal was received, and wherein the instructions to calculate the charge amount comprise instructions to:
  determine a rental end time corresponding to a time at which the second beacon signal was received;
  extract the rental start time from the data structure; and
  calculate the charge amount based upon a rental duration derived from a difference between the rental start time and the rental end time.

5. The non-transitory computer-readable medium of claim 2, wherein receiving the first beacon signal triggers an exit event to start rental of the first rental item and receiving the second beacon signal triggers a data structure entry event to end rental of the rental item.

6. The non-transitory computer-readable medium of claim 1, wherein the instructions comprise instructions to:
  in response to verifying the user identifier of the second user requesting rental of the first rental item, transmitting a command to a store controller to transport the first rental item from a storage location to a rental pickup location.

7. The non-transitory computer-readable medium of claim 1, wherein the first beacon device comprises a Bluetooth beacon sticker attached to the first rental item, wherein the first beacon identifier of the first beacon device comprises the identifier of the rental item to which the first beacon device is attached.

8. The non-transitory computer-readable medium of claim 1,
  in response to receiving the first beacon signal, rendering a user interface on the computing device, wherein the user interface is populated with customer information of the second user, rental item information of the first rental item, and an indication as to whether the first rental item is currently rented or available for rent.

9. A computing system, comprising:
  a processor connected to a memory; and
  a communication module stored on a non-transitory computer readable medium and configured with instructions that when executed by the processor cause the processor to:
    maintain a data structure that maps user identifiers of users to beacon identifiers of beacon devices associated with rental items being rented by corresponding users;
    wherein the data structure includes a table having a plurality of rows wherein each row corresponds with a rental item that is being rented, and wherein each row includes an identifier of the rental item, a beacon identifier of a beacon device attached to the rental item, a booking identifier indicating that a first user is renting the rental item, and a user identifier of the first user renting the rental item;

wherein a row is created in the data structure when a rental of the rental item begins and the row is removed from the data structure when the rental ends;

control a wireless receiver of the computing device to listen for a beacon signals transmitted by the beacon devices associated with the rental items;

wherein the wireless receiver listens for the beacon signals according to a monitoring mode;

while in the monitoring mode, in response to receiving, by the wireless receiver, a first beacon signal from a first beacon device associated with a first rental item;

parse the first beacon signal to identify a beacon device type as a type of rental item associated with the first beacon device, but not a first beacon identifier of the first beacon device;

transition to listening for the beacon signals according to a ranging mode;

while in the ranging mode, parse the first beacon signal to identify the first beacon identifier of the first beacon device associated with the first rental item;

query, using the first beacon identifier of the first beacon device, the data structure to determine whether the first beacon identifier of the first beacon device is mapped within the data structure to the user identifier of the first user; and in response to the first beacon identifier not being mapped within the data structure, which indicates that the first rental item is not currently being rented:

identify a user identifier of a second user requesting rental of the first rental item associated with the first beacon identifier and verify the user identifier of the second user;

create a new row within the data structure to map the user identifier of the second user to the first beacon identifier to indicate that the second user is now renting the first rental item; and configure the first beacon device associated with the first rental item to set the first beacon identifier to the booking identifier to indicate that the second user is now renting the first rental item.

10. The computing system of claim 9, wherein the instructions comprise instructions that cause the processor to:

receive, by the wireless receiver, a second beacon signal from the first beacon device;

parse the second beacon signal to identify the first beacon identifier of the first beacon device;

query, using the first beacon identifier of the first beacon device, the data structure to determine that the first rental item was being rented by the second user based upon the data structure comprising the new row mapping of the user identifier of the second user to the first beacon identifier of the first beacon device;

determine that the first rental item is being returned to end the rental of the first rental item;

calculate a charge amount for the second user renting the first rental item;

execute a charge command to charge the charge amount to an account of the second user; and remove the new row from the data structure to indicate that the first rental item is not currently being rented.

11. The computing system of claim 10, wherein the instructions comprise instructions that cause the processor to:

in response to determining that the first rental item is being returned to end the rental, configure the first beacon device to reset the first beacon identifier of the first beacon device from the booking identifier to the identifier of the rental item.

12. The computing system of claim 9, wherein the instructions comprise instructions that cause the processor to:

perform at least one of a facial recognition verification, a voice recognition verification, a fingerprint recognition verification, or a biometric recognition verification to authenticate the second user for renting the first rental item.

13. The computing system of claim 12, wherein the instructions comprise instructions that cause the processor to:

in response to authenticating the second user:

create the booking identifier to indicate that the second user is now renting the first rental item; and dynamically configure the first beacon device to set the first beacon identifier of the first beacon device from the identifier of the rental item to which the first beacon device is attached to the booking identifier.

14. A computer-implemented method, the computer-implemented method involving a computing device comprising a processor, and the computer-implemented method comprising:

maintaining, by the processor, a data structure that maps user identifiers of users to beacon identifiers of beacon devices associated with rental items being rented by corresponding users;

wherein the data structure includes a table having a plurality of rows wherein each row corresponds with a rental item that is being rented, and wherein each row includes an identifier of the rental item, a beacon identifier of a beacon device attached to the rental item, a booking identifier indicating that a first user is renting the rental item, and a user identifier of the first user renting the rental item;

wherein a row is created in the data structure when a rental of the rental item begins and the row is removed from the data structure when the rental ends;

controlling, by the processor, a wireless receiver of the computing device to listen for beacon signals transmitted by the beacon devices associated with the rental items;

wherein the wireless receiver listens for the beacon signals according to a monitoring mode;

while in the monitoring mode, in response to receiving, by the wireless receiver, a first beacon signal from a first beacon device associated with a first rental item:

parse the first beacon signal to identify a beacon device type as a type of rental item associated with the first beacon device, but not a first beacon identifier of the first beacon device;

transition to listening for the beacon signals according to a ranging mode;

while in the ranging mode, parsing, by the processor, the first beacon signal to identify the first beacon identifier of the first beacon device associated with the first rental item;

querying, by the processor, using the first beacon identifier of the first beacon device, the data structure to determine whether the first beacon identifier of the first beacon device is mapped within the data structure to the user identifier of the first user; and in response to the first beacon identifier not being mapped within the data structure, which indicates that the first rental item is not currently being rented:
- identifying, by the processor, a user identifier of a second user requesting rental of the first rental item associated with the first beacon identifier and verify the user identifier of the second user;
- creating, by the processor, a new row within the data structure to map the user identifier of the second user to the first beacon identifier of the first beacon device to indicate that the second user is now renting the first rental item; and
- configuring, by the processor, the first beacon device associated with the first rental item to set the first beacon identifier of the first beacon device to the booking identifier to indicate that the second user is now renting the first rental item.

15. The computer-implemented method of claim 14, further comprising:
- receiving, by the wireless receiver, a second beacon signal from the first beacon device;
- parsing the second beacon signal to identify the first beacon identifier of the first beacon device;
- querying, using the first beacon identifier of the first beacon device, the data structure to determine that the first rental item was being rented by the second user based upon the data structure comprising the new row mapping of the user identifier of the second user to the first beacon identifier of the first beacon device;
- determining that the first rental item is being returned to end the rental of the first rental item;
- calculating a charge amount for the second user renting the first rental item;
- executing a charge command to charge the charge amount to an account of the second user; and
- removing the new row from the data structure to indicate that the first rental item is not currently being rented.

16. The computer-implemented method of claim 15, further comprising:
- parsing the second beacon signal to extract motion sensor data collected during rental of the first rental item;
- evaluating the motion sensor data to determine an amount of time the first rental item was being operated, wherein the first rental item is determined to be in operation when values of the motion sensor data exceed a threshold indicative of operational movement of the first rental item; and
- calculating the charge amount based upon the amount of time the first rental item was being operated.

17. The computer-implemented method of claim 15, further comprising:
- parsing the second beacon signal to extract temperature sensor data collected during rental of the first rental item;
- evaluating the temperature sensor data to determine an amount of time the first rental item was being operated, wherein the first rental item is determined to be in operation when values of the temperature sensor data exceed a threshold indicative of operational temperatures of the first rental item; and
- calculating the charge amount based upon the amount of time the first rental item was being operated.

18. The computer-implemented method of claim 14, further comprising:
- parsing the second beacon signal to extract sensor data collected during rental of the first rental item;
- evaluating the sensor data to determine an amount of time the first rental item was being operated, wherein the first rental item is determined to be in operation when values of the sensor data exceed a threshold indicative of operation of the first rental item; and
- calculating the charge amount based upon the amount of time the first rental item was being operated.

19. The computer-implemented method of claim 14, further comprising:
- perform a verification to authenticate the second user for renting the first rental item; and
- in response to authenticating the second user:
  - create the booking identifier to indicate that the second user is now renting the first rental item; and
  - dynamically configure the first beacon device to set the first beacon identifier of the first beacon device from the identifier of the rental item to which the first beacon device is attached to the booking identifier.

* * * * *

UNITED STATES PATENT AND TRADEMARK OFFICE
CERTIFICATE OF CORRECTION

| | | |
|---|---|---|
| PATENT NO. | : 11,379,909 B2 | |
| APPLICATION NO. | : 15/970078 | |
| DATED | : July 5, 2022 | |
| INVENTOR(S) | : Dcosta et al. | |

It is certified that error appears in the above-identified patent and that said Letters Patent is hereby corrected as shown below:

In the Specification

In Column 14, Line 49, delete "FIG. 7(A))" and insert -- FIG. 7) --, therefor.

In Column 16, Line 47, delete "on)." and insert -- on. --, therefor.

In Column 17, Line 3, delete "U.S.C" and insert -- U.S.C. --, therefor.

In Column 17, Line 53, delete "U.S.C" and insert -- U.S.C. --, therefor.

In the Claims

In Column 21, Line 6, in Claim 9, after "for" delete "a", therefor.

Signed and Sealed this
Twenty-seventh Day of December, 2022

Katherine Kelly Vidal
*Director of the United States Patent and Trademark Office*